3,682,733
COATED PAPER
Gesienus Smit, Sappemeer, Netherlands, assignor to Scholten-Honig Research N.V., Foxhol, Netherlands
No Drawing. Continuation-in-part of application Ser. No. 683,019, Nov. 14, 1967, now Patent No. 3,591,412. This application Mar. 10, 1971, Ser. No. 123,027
Claims priority, application Japan, Nov. 15, 1966, 41/75,164
Int. Cl. D21h 1/24, 1/28
U.S. Cl. 117—156
10 Claims

ABSTRACT OF THE DISCLOSURE

Mat, wet-rub resistant pigment-coated paper is manufactured by coating a paper surface with an aqueous alkaline coating color having a pH of at least 8 and containing:
(a) a pigment consisting essentially of 3–25% satin white, 55–97% calcium carbonate and 0–40% clay, based on the weight of the pigment, and
(b) an at least 0.2% by weight of phosphorus containing, depolymerized starch phosphate ester in an amount effective as a binder for the pigment.

---

This application is a continuation-in-part of Ser. No. 683,019, filed Nov. 14, 1967, now Pat. No. 3,591,412, patented July 6, 1971.

The invention relates to the coating paper and more particularly to a process for producing wet-rub resistant paper coatings which contain satin white as a pigment. Printing paper employed in the publishing industry, such as that used in magazines, must possess certain minimum characteristics. Thus, such printing papers should have a smooth printing surface, uniform ink receptivity, high ink holdout, high pick resistance, high opacity, while a high brightness and high gloss is also desirable. Therefore, the industry produces printing paper, by coating paper with coating colors composed of water, pigments and binders.

Suitable pigments for coating purposes are: china clay, calcium carbonate, titanium dioxide, diatomaceous earth, barium sulfate, talc and satin white. Satin white is a needle shaped pigment, which is generally given the chemical name of calcium sulfoaluminate. The most generally accepted chemical formula is:

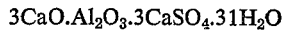
$$3CaO \cdot Al_2O_3 \cdot 3CaSO_4 \cdot 31H_2O$$

It is a reaction product of alum $Al_2(SO_4)_3$ and slaked lime $Ca(OH)_2$ and is usually produced as a paste containing about 30% solids. The pigment shows a strong alkaline reaction, and may contain 0.1–5% (by weight of air-dried satin white) of free lime, occluded within crystalline flocs.

In coating paper satin white is often applied in combination with other pigments, such as clay and/or calcium carbonate and/or titanium dioxide. Usually its application has been limited to the higher priced grades of coated paper. One of the problems of satin white in paper coating is, that coating compositions which contain satin white as a pigment are unstable. While the freshly prepared coating colors containing satin white initially are fluid, they tend to show such an increase in viscosity as to seriously upset coating operations. The increase in viscosity may be such that the coating color gels and is inoperable. This disadvantage of satin white can be reduced by dispersing satin white utilizing casein, gum arabic or certain starch ethers, such as hydroxyethyl starch, as a protective or stabilizing colloid in combination with a chelating agent, such as sodium citrate. It is generally accepted that the sodium citrate forms coordination compounds with the calcium ions and thereby prevents their gelling action.

Suitable binders for coating purposes are casein, soya protein and starches which have been modified by oxidizing agents, enzymes or heat. In Tappi Monograph Series No. 17 "Starch and starch products in paper coating" (1957) it is described that the viscosity of unmodified starch is too high for use as a binder in paper coating. Therefore, the starch has to be depolymerized by subjecting it to various treatments to reduce its molecular weight, and hence permit higher concentrations at reasonable viscosity. These treatments involve reaction with oxidizing agents, hydrolytic enzymes, acids or dextrinizing. The above protein and starch binders may be used in conjunction with synthetic binders, such as carboxymethyl cellulose, styrene-butadiene copolymer latices, acrylate latices, polyvinyl acetate dispersions and the like. The protein binders have the disadvantage that their prices are comparatively high, which limits their application to the higher priced grades of coated paper, such as art paper. Their advantage, however, lies in the fact that protein based coatings are easily made wet-rub resistant, for instance by using satin white as pigment.

In contradistinction herewith, none of the modified starches, which are widely used for coating purposes at present, are rendered water-insoluble by satin white pigment. In order to make wet-rub resistant paper coatings with the common starch binders, they must be hardened with resin precondensates at high temperatures in acid medium at low pH values. These hardening conditions are attended by several disadvantages and result in poor surface and poor printing properties, for instance with respect to ink drying. Until now, no modified starches are known, which, like the protein binders, give coating colors containing satin white pigment that become wet-rub resistant on drying. It is therefore a principal object of the invention to provide viscosity stable, starch-based coating colors containing satin white as a pigment that will work perfectly on all kinds of coaters and which upon drying give wet-rub resistant coatings, said coatings having excellent surface and printing characteristics.

We have now found a process for the manufacture of wet-rub resistant coated paper by applying a coating color containing an amylaceous binder for the pigments to the surface of paper and drying the coated paper, said process being characterized in that the pigment consists for 3–100% of satin white, that the amylaceous binder is at least partly a depolymerized starch phosphate ester and that the coating color has an alkaline reaction.

Surprisingly, the rheological properties of such coating colors based on satin white and depolymerized starch phosphate esters are at least as good as those of satin white-casein coating colors, while on the other hand the wet-rub resistance of the dry coating is also excellent. Furthermore, the surface and printing properties of paper coated with these coating colors are very good, so that for the first time a starch based coating composition has been developed which gives results, which are at least equivalent with a casein based coating composition in all respects. The new starch based coating colors, therefore, can be used in the manufacture of the finest grades of printing paper, such as art paper.

It has been established that the depolymerized starch phosphate esters have excellent stabilizing properties for satin white dispersions, making it possible to prepare dispersions of constant viscosity. In case very effective mixing equipment is used for the make up of the satin white pigment dispersions it is even possible to obtain stable dispersions without the use of sequestering agents.

When less efficient mixing equipment is used, it is desirable to add a small amount of a sequestering agent in the make up of the satin white dispersion. The coating color thus obtained is very stable over relatively long periods of time but, surprisingly, yields very wet-rub-resistant coatings when dried on paper. The insolubilizing reaction is not adversely affected by the presence of the small amount of a sequestering agent.

As indicated above the pigment used contains 3–100% of satin white, said percentage being calculated on the dry material. The use of satin white as the sole pigment in coated paper, however, has some disadvantages, such as the relatively high prices of satin white, the low solids content of such a coating color and the need for heavily calendering of the printing paper, resulting in flat prints. For these reasons satin white will almost never be used as the sole pigment in practice. Preferably the pigment in the coating colour consists for 5–50% of satin white, calculated by weight of air dried product. The rest of the pigment consists preferably of clay, while smaller quantities of calcium carbonate and titanium dioxide also may be used.

In order to prevent decomposition of the satin white pigment, the coating color should have an alkaline reaction, the pH value being preferably above 8.0.

The depolymerized starch phosphate esters can be obtained by various methods. In a preferred method they are manufactured by heating starch in admixture with a compound selected from the group consisting of phosphorus containing acids and water-soluble acid salts of phosphorus containing acids and with a water-soluble nitrogen compound selected from the group consisting of amides, amines and ammonium salts.

Suitable phosphorus containing acids are orthophosphoric acid, pyrophosphoric acid, metaphosphoric acid and polyphosphoric acid. Instead of the phosphorus containing acids it is also possible to use acid akali metal or ammonium salts thereof, or partially neutralized phosphorus containing acids.

The water-soluble nitrogen compounds should be non-volatile. A preferred amide is urea. Other suitable amides are methylurea, methylol urea; acetylurea, thiourea, cyanamide, dicyandiamide, formamide and acrylamide. Suitable amines are the alkylolamines such as triethanolamine. The preferred ammonium salts are those derived from inorganic acids which are derived from acids which are weaker than orthophosphoric acids, such as ammonium carbonate, and those derived from organic acids.

In another method the phosphorylation is effected by heating starch in admixture with a water-soluble acid salt of a phosphorus containing acid in the absence of a water-soluble nitrogen compound The esterification may be carried out by heating a homogeneous mixture of starch, the phosphorus containing acid or acid salt thereof and the water-soluble nitrogen compound, if any, at a temperature which is in the range of from about 80° C. to about 200° C. Below this temperature range the esterification reaction is too slow and above this temperature range charring may occur. The heating time is from 24 hours-15 minutes, dependent from the temperature used. Preferably the heat treatment is carried out at a temperature of from about 100° C. to about 170° C. for a period of 5 hours-30 minutes.

The use of a vacuum and/or the absence of oxygen, though not essential, may be helpful to promote the reaction. The depolymerized starch phosphates of the invention, which should at least contain 0.2% by weight of phosphorus, are obtained by heating starch with 1–20% of a free phosphoric acid and/or with 1–40% of an acid salt thereof, if necessary in the presence of 1–50% of a water-soluble nitrogen compound, based on the weight of the starch. When the nitrogen compound used is urea the preferred range is 5–25%. If desired other strong acids may be included in the reaction mixture, such as hydrochloric acid or sulfuric acid.

The pH values and the heating conditions should be selected in such a way that mono-starch phosphate esters are formed predominantly.

The term starch, is intended to include all types of modified and unmodified starchs, such as native starch, pregelatinized starch, acid modified starch, oxidized starch, enzyme modified starch, dextrinized starch, etherified starch, esterified starch, or fractionated starch such as amylose and amylopectin. The starch may be of any origin such as corn, high-amylose corn, waxy maize, potato, wheat, rice, tapioca or sago starch. The term starch as used herein is not confined to purified starches, but also include flours.

In general the depolymerization of the starch is effected conjointly with the esterification of the starch with phosphate groups. The depolymerization should be such that a product of a suitable viscosity for a binder in a coating color is obtained. The viscosity of the depolymerized starch phosphates therefore should be preferably be below 800 centipoises when measured in a 15% aqueous solution at 25° C. in a rotational viscometer at a rate of shear of 480 sec.$^{-1}$. This viscosity range is usually reached in the heat treatment in the presence of the phosphorus containing acid or acid salt thereof. It is, however, possible to effect the esterification and depolymerization independently by taking a depolymerized starch and esterifying this starch without substantial degradation, or by esterifying unmodified starch without substantial degradation and depolymerizing the starch ester by known means.

In stead of using starch phosphate as the sole binder in the coating colors, it is also possible to use the starch phosphate in admixture with other binders, such as for instance oxidized starch, carboxymethyl cellulose, polyvinyl alcohol, styrenebutadiene copolymer latices, acrylate latices or polyvinyl acetate dispersions.

Sequestering agents capable of forming coordination compounds with the calcium ions in the satin white are by way of example alkali salts of 1° alpha-hydroxy carboxylic acids (citric, tartaric, gluconic and lactic acid) 2° polybasic organic acids (succinic acid) 3° nitrogen containing polybasic organic acids (ethylenediamine tetraacetic acid, nitrile triacetic acid) 4° phytic acid. A very effective combination is a mixture of sodium citrate and the sodium salt of methylene naphthalene sulfonic acid. As mentioned above the use of a sequestering agent may be superfluous, in case very effective mixing equipment is used.

There are several methods by which the coating color can be prepared. By a first method the depolymerized starch phosphate ester is dissolved by cooking with for instance, the double quantity of water and the pH of the cooled solution is adjusted to from about 8 to about 9. A part of this phosphate solution is than added to a satin white paste (for instance starch phosphate is added in an amount of about 20% by weight of the dry satin white), after which the mixture is dispersed in a rotor or kneader. If desirable, a small amount of a sequestering agent may be added at this stage. In a separate operation china clay is dispersed in water, using a small amount of a dispersing agent, such as e.g. sodium hexameta phosphate. The rest of the starch phosphate solution is then added to the clay dispersion and the mixture is homogenized. Thereafter the satin white dispersion is added to the clay dispersion, the mixture homogenized and the solids content of the coating color adjusted by the addition of water. At this stage also a latex may be added under moderate stirring, to prevent foaming. In a second method the whole starch phosphate solution of pH 8–9 is slowly added to the satin white paste. Under continuous homogenization clay, water and polyphosphate are added to this mixture. Finally the solids content is adjusted by addition of water and if desired a latex is introduced. In a third method the satin white paste and a sequestering agent are treated in a kneader, whereupon a polyphosphate and clay are added while kneading.

To the pigment dispersion thus obtained the aqueous starch phosphate solution is added, whereafter the solids content of the coating color is adjusted. The choice of the method of preparation the coating color to be used depends a.o. on the type of the available mixing equipment, the solids content of the coating color and the percentage of satin white in the pigment. The viscosity of the depolymeirzed starch phosphate is also of importance, the make up of coating colors with low viscous starch phosphates being less complicated than with the higher viscous types. For a more detailed description of the mixing equipument to be used in the coating preparation reference is made to Tappi Monograph Series No. 28 "Pigmented Coating" Processes for Paper and Board (1965) Part. III.

The coating colors can be applied to paper by means of all kinds of coating equipment, such as air knife coaters, roll coaters and blade coaters. Various coaters to be used for carrying out this invention are described in the same Tappi Monograph Part I.

The coated paper can be dried in a conventional way using air or convection driers, contact or conduction driers or driers using radiant energy. A survey of possible drying equipment is given in Part II of the cited Tappi Monograph. It should be remarked that high drying temperatures are not necessary for the insolubilizing reaction. Moreover, the drying takes place in a weakly alkaline pH range, which results in improved printing properties of the coated paper. The insolubilizing conditions according to the invention thus are much less severe than the hardening conditions for conventional starch based coating colors.

The invention also covers coating colors to be used in the processes described above, said coating colors comprising an alkaline mixture of water, a pigment a coating color for the manufacture of wet-rub resistant coated paper comprising an alkaline mixture of water, a pigment consisting as to 3 to 100% of satin white and a binder consisting at least partly of a depolymerized starch phosphate ester.

The invention further covers the wet-rub resistant pigment coated paper obtained by the processes described above, said paper comprising a paper base provided with wet-rub resistant pigment coated paper comprising a paper base provided with a coating containing a pigment consisting for 3 to 100% of satin white and a binder consisting at least partly of a depolymerized starch phosphate ester.

The process according to the invention is also important for the manufacture of mat coated paper for offset printing. Mat coated paper is often preferred over glossy paper, because the contrast between printed ink, which has a gloss of its own, and the mat paper is higher and therefore the print is clearer. In order to obtain a mat coating, pigments such as calcium carbonate or barium sulphate must be used. Other pigments such as clay and satin white tend to form more glossy coatings, especially after calendering.

We have found that excellent mat, wet-rub resistant pigment-coated papers are obtained when a paper surface is coated with an aqueous alkaline coating color having a pH of at least 8 and containing:

(1) a pigment consisting essentially of satin white, calcium carbonate and clay, the percentage of dry satin white being about 3 to 25%, the percentage of calcium carbonate being about 55 to 97% and the percentage of clay being from 0–40% based on the weight of the pigment and (2) a depolymerized starch phosphate ester in an amount effective as a binder for the pigment, said ester containing at least 0.2% by weight of phosphorus and the coated paper is dried.

In case the pigment does not contain clay, it will essentially consist of about 3 to 25% of satin white (calculated as dry satin white) and of about 75% to 97% of calcium carbonate, both based on the weight of the pigment. In special cases small quantities, up to 10% of other pigments, such as titanium dioxide or barium sulphate may be present. The calcium carbonate to be used according to the invention may be natural ground whiting, but can also be a precipitated calcium carbonate.

The effective amount of binder for the pigment for mat coated offset paper lies in the range of about 10 to 25 weight percent of binder on the weight of the pigment. This binder may completely consist of a depolymerized starch phosphate ester, but it may also consist of combinations of a depolymerized starch phosphate ester and oxidised starch, carboxymethyl cellulose, polyvinyl alcohol, a styrene-butadiene copolymer latex, an acrylate latex and a polyvinyl acetate dispersion. Preferably the binder consists for 50% or more of a depolymerized starch phosphate ester.

The invention will be illustrated by the following examples. In these examples the wet-rub resistance of the coatings is measured by means of an Adams Wet-Rub tester (Montague Machine Co., Turners Falls, Massachusetts, U.S.A.). In this apparatus test strips of the coated paper are subjected to a wet, rotating rubber roll for 10 seconds. As a result of this treatment particles of pigment are loosened from the coating and are collected in a pan. In case of a wet-rub resistant coating only few pigment particles will be loosened, but if the wet-rub resistance is insufficient many pigment particles are collected in the pan. The amount of pigment in the pan is measured by means of a turbidity meter (E.E.L. absorptiometer; Evans Electroselenium Ltd., Halstead Great Britain), the transmission of distilled water being set at 100. A coating is considered to be very good wet-rub resistant when the reading is above 80. In the examples the parts are expressed as parts by weight.

EXAMPLE 1

A coating color for use in the manufacture of art paper is made using a depolymerized starch phosphate ester obtained by heating a mixture of 1000 parts of tapioca starch, 75 parts of ortho phosphoric acid and 140 parts of urea for 45 minutes at a temperature of 126° C. A 15% aqueous solution of this thin boiling starch phosphate has a viscosity of 34 centipoises at 25° C.

77 parts of the starch phosphate are dissolved in 155 parts of water by cooking. The pH of the cooled solution is adjusted to 8.5 by addition of ammonia. The starch phosphate solution is slowly added to 215 parts of a 30% satin white paste (product of Zschimmer und Schwarz Chemische Fabriken, Oberlahnstein, Germany) using a high shear rotor mixer. To this mixture are added under vigorous stirring 0.8 part of Calgon PTH (sodium polyphosphate; product of Joh. A. Beckiser Chemische Fabrik, Ludwigshafen, Germany), 260 parts of china clay S.P.S. and water in such proportions that the mass remains pasty all the time, which promotes a good dispersion of the clay particles.

Finally so much water is added to the dispersion as is necessary to adjust the solids content of the coating color to 38%. The flow time of this coating color from a Ford cup with a 4 mm. diameter is 19 seconds at 25° C.

The coating is applied to a high quality cellulosic fiber paper by means of an air knife coater, whereupon the coated paper is dried and calendered. The wet-rub resistance of the coated paper measured by means of the Adams Wet-Rub tester is 91, which is excellent.

If in the above coating formula 25 parts of starch phosphate are replaced by 50 parts of Dow Latex 636 (a styrene-butadiene copolymer latex manufactured by Dow Chemical Company, Midland, Mich., U.S.A.; 50% dry substance), a coating color is obtained having a flow time from the same Ford cup of 22 seconds at 25° C. When this latex containing coating is applied to paper, the wet-rub resistance of the coated paper is slightly improved, the reading in the Adams Test being 98.

EXAMPLE 2

Starch is depolymerized and esterified by heating 1000 parts of potato starch, 60 parts of polyphosphoric acid and 145 parts of urea for 35 minutes at a temperature of 124° C. The thin boiling starch phosphate thus obtained has a viscosity of 92 centipoises at 25° C. in a 15% aqueous solution. 200 parts of the starch phosphate are cooked with 400 parts of water. The solution is cooled to 40° C. and the pH of the solution is adjusted to 8.0 with sodium hydroxide.

267 parts of the 30% satin white paste used in Example 1 are dispersed with 48 parts of the starch phosphate solution, using a high shear rotor mill. Under stirring 0.8 part of a mixture of sodium citrate and the sodium salt of methylene naphthalene sulfonic acid, known under the trade name Bellutex (Joh. A. Benckiser Chemische Fabrik, Ludwigshafen, Germany) are added. In a separate container 2.8 parts of Polysalz (a salt of a polycarboxylic acid of Badische Anilin- & Soda Fabrik A.G., Ludwigshafen, Germany) are dissolved in 460 parts of water and in this solution 920 parts of china clay S.P.S. are dispersed using a high shear rotor. To this clay dispersion the remaining 552 parts of starch phosphate solution is added.

Thereupon the satin white dispersion is added to the clay dispersion and the mixture is stirred until it is homogeneous. By adding 753 parts of water the solids of the coating are adjusted to 40%. The viscosity of this coating, as measured by a Drage Rheomat-15, is 120 centipoises at 25° C.

Paper is coated with this coating color by means of a size press and the coated paper is dried and calandered. This procedure is repeated with the exception that several water soluble modified starches of comparable viscosity are substituted for the water soluble starch phosphate in the above formula. The wet-rub resistance as measured by Adams test is as follows:

| Modified starch: | Wet-rub, resistance |
|---|---|
| Starch phosphate | 90 |
| Hypochlorite oxidized starch | 9 |
| Dextrinized starch | 6 |
| Hydroxyalkyl starch | 2 |
| Carboxyalkyl starch | 0 |
| Sulfoalkyl starch | 0 |
| Starch acetate | 4 |

When on the other hand the satin white is omitted from the formula and china clay is used as the sole pigment in combination with the starch phosphate binder, the wet-rub resistance of the coated paper in the Adam test is 0.

From these figures it may be concluded that only the combination of satin white and starch phosphate yields a wet-rub resistant coating.

EXAMPLE 3

1000 parts of corn starch are intimately mixed with 100 parts of orthophosphoric acid, which has been neutralized with sodium hydroxide to a pH of 4.0. The mixture is heated for 40 minutes at a temperature of 150° C. The viscosity of a 15% aqueous solution at 25° C. of the thin boiling starch phosphate ester is 36 centipoises.

This starch phosphate is used in the following air knife coating formula:

| | | |
|---|---|---|
| Satin white paste 30% | parts | 110 |
| Sodium salt of ethylene diamine testra-acetic acid | do | 0.15 |
| Sodium polyphosphate | do | 1.0 |
| China clay S.P.S. | do | 300 |
| Starch phosphate | do | 67 |
| Water | do | 523 |
| Total solids | percent | 40 |
| Ford cup flow time (4 mm. diameter) | seconds | 22 |

This coating color is prepared by dispersing the satin white and the sodium salt of ethylene diamine tetra-acetic acid in a kneader, adding the polyphosphate and dispersing the clay and water while kneading, until a homogeneous dispersion is obtained. To this dispersion a solution of the starch phosphate in water of pH 8.5 is mixed in, whereupon the final quantity of water to adjust the solids content to 40% is added.

The coating color is applied to a magazine paper stock by means of an air-knife. The resultant paper is of excellent quality, having good printing characteristics and being free of objectionable yellowing which often occurs when casein is used in a satin white coating. The wet-rub resistance of the coating according to the Adams test is 87.

EXAMPLE 4

A deploymerized starch phosphate ester obtained by heating potato starch, urea and phosphoric acid containing 0.9% phosphorus and having a viscosity of 60 centipoises at 25° C. in 15% aqueous solution is used as a binder in a coating color for making mat offset printing paper. The pigment consists of satin white and calcium carbonate and in some instances also clay. In one formula 50% of the starch phosphate ester is replaced by an acrylate latex.

The coatings are made by dispersing a 30% satin white paste and a small amount of sodium polyacrylate (Dispex N40) in a high shear rotor mill and adding the calcium carbonate and clay, if any, and water while stirring, until a homogeneous dispersion is obtained. About 2% of dispersing agent used on the weight of the pigment to this dispersion a 25% aqueous solution of the starch phosphate ester (adjusted to pH 9.5 with ammonia) is added, whereupon additional water is added to adjust the solids content to 55%. In one formula an acrylate ester copolymer (Acronal S320D) is added in stead of a part of the additional water. The coating color is applied by means of a Dixon blade to 80 grams natural paper, having a Cobb value of 20. The coated paper is calandered at 70° C. in two nips at 150 kg. per linear cm.

The following results are obtained:

| | Color composition | | | | | Coated paper | | |
|---|---|---|---|---|---|---|---|---|
| Formula | Satin white | CaCO₃ | Clay | Starch phosphate | Acrylate | Add-on | Gloss | Wet rub [11] |
| 1 | 15 | 85 | | 16 | | 11 | 12 | 80 |
| 2 | 15 | 85 | | 8 | 8 | 10.5 | 13 | 95 |
| 3 | 10 | 55 | 35 | 16 | | 9.5 | 16 | 75 |
| 4 | 5 | 85 | 10 | 16 | | 11.5 | 9 | 92 |
| 5 | 20 | 60 | 20 | 16 | | 11.5 | 15 | 80 |

Since for mat paper the gloss should be lower than about 20 (as measured by light reflection using a scale of 0–100) and the wet-rub (as measured by means of the Adams Wet-Rub tested) after 10 seconds should be above 70, the experiments indicate that in all cases a suitable mat offset printing paper is obtained.

I claim:

1. A process for the manufacture of mat wet-rub resistant pigment-coated paper which consists of coating, a paper surface with an aqueous alkaline coating color having a pH of at least 8 and containing:
  (1) a pigment consisting essentially of satin white, calcium carbonate and clay, the percentage of dry satin white being from about 3 to 25%, the percentage of calcium carbonate being from about 55 to 97% and the percentage of clay being from 0 to 40%, based on the weight of the pigment, and
  (2) a depolymerized starch phosphate ester in an amount effective as a binder for the pigment, said ester containing at least 0.2% by weight of phosphoru, and drying the coated paper.

2. A process for the manufacture of mat wet-rub resistant pigment-coated paper which consists of coating a paper surface with an aqueous alkaline coating color having a pH of at least 8 and containing:
  (1) a pigment consisting essentially of satin white and calcium carbonate, the percentage of dry satin white being from about 3 to 25% and the percentage of calcium carbonate being from about 75 to 97%, based on the weight of the pigment, and
  (2) a depolymerized starch phosphate ester in an amount effective as a binder for the pigment, said ester containing at least 0.2% by weight of phosphorus, and drying the coated paper.

3. A process according to claim 1, characterized in that the pigment contains a small quantity of a substance selected from the group consisting of titanium dioxide and barium sulphate.

4. A process according to claim 2, characterized in that the pigment contains a small quantity of a substance selected from the group consisting of titanium dioxide and barium sulphate.

5. A process according to claim 1, characterized in that the coating color contains an additional binder selected from the group consisting of oxidized starch, carboxymethyl cellulose, polyvinyl alcohol, a styrene butadiene copolymer emulsion, an acrylate latex and a polyvinyl acetate dispersion.

6. A process according to claim 2, characterized in that the coating color contains an additional binder selected from the group consisting of oxidized starch, carboxymethyl cellulose, polyvinyl alcohol, a styrene butadiene copolymer emulsion, an acrylate latex and a polyvinyl acetate dispersion.

7. A coating color composition for the manufacture of mat wet-rub resistant coated paper consisting essentially of an alkaline mixture of:
  (1) water,
  (2) a pigment consisting essentially of satin white, calcium carbonate and clay, the percentage of dry satin white being from about 3 to 25%, the percentage of calcium carbonate being from about 55 to 97%, and the percentage of clay being from 0 to 40%, based on the weight of the pigment, and
  (3) a binder which consists essentially of a depolymerized starch phosphate ester, said ester containing at least 0.2% by weight of phosphorus.

8. A coating color composition for the manufacture of mat wet-rub resistant coated paper consisting essentially of an alkaline mixture of:
  (1) water,
  (2) a pigment consisting essentially of satin white and calcium carbonate, the percentage of dry satin white being from about 3 to 25% and the percentage of calcium carbonate being from about 75 to 97%, based on the weight of the pigment, and
  (3) a binder which consists essentially of a depolymerized starch phosphate ester, said ester containing at least 0.2% by weight of phosphorus.

9. Mat wet-rub resistant coated paper comprising a paper base provided with a coating consisting essentially of:
  (1) a pigment consisting essentially of satin white, calcium carbonate and clay, the percentage of dry satin white being from about 3 to 25%, the percentage of calcium carbonate being from about 55 to 97% and the percentage of clay being from 0 to 40%, based on the weight of the pigment, and
  (2) a depolymerized starch phosphate ester in an amount effective as a binder for the pigment, said ester containing at least 0.2% by weight of phosphorus.

10. Mat wet-rub resistant coated paper comprising a paper base provided with a coating consisting essentially of:
  (1) a pigment consisting essentially of satin white and calcium carbonate, the percentage of dry satin white being from about 3 to 25% and the percentage of calcium carbonate being from about 75 to 97%, based on the weight of the pigment, and
  (2) a depolymerized starch phosphate ester in an amount effective as a binder for the pigment, said ester containing at least 0.2% by weight of phosphorus.

References Cited
UNITED STATES PATENTS

| | | | |
|---|---|---|---|
| 3,144,298 | 8/1964 | Hullinger et al. | 117—156 X |
| 3,211,564 | 10/1965 | Lauterbach | 117—156 X |
| 3,245,816 | 4/1966 | Schwalbe | 117—156 X |
| 3,248,225 | 4/1966 | Bode | 117—156 X |
| 3,269,855 | 8/1966 | Moes et al. | 117—156 X |
| 3,318,715 | 5/1967 | Tetenbaum | 117—156 X |
| 3,320,081 | 5/1967 | Young et al. | 117—156 X |
| 3,329,523 | 7/1967 | Best et al. | 117—156 X |
| 3,346,406 | 10/1967 | Macbugan et al. | 117—156 X |
| 3,387,998 | 6/1968 | Powers | 117—156 |
| 3,411,925 | 11/1968 | Lauterbach | 117—156 X |

FOREIGN PATENTS

| | | | |
|---|---|---|---|
| 207,300 | 3/1957 | Australia | 117—156 |

WILLIAM D. MARTIN, Primary Examiner

M. R. LUSIGNAN, Assistant Examiner

U.S. Cl. X.R.

106—214; 117—155 UA, 157; 260—17.4 ST, 223.5